Nov. 25, 1930.  J. E. HIRST  1,783,041
WOODWORKING MACHINERY
Filed Aug. 22, 1929   2 Sheets-Sheet 1

INVENTOR.
James E. Hirst
BY James N. Ramsey
ATTORNEY.

Nov. 25, 1930.  J. E. HIRST  1,783,041
WOODWORKING MACHINERY
Filed Aug. 22, 1929   2 Sheets-Sheet 2
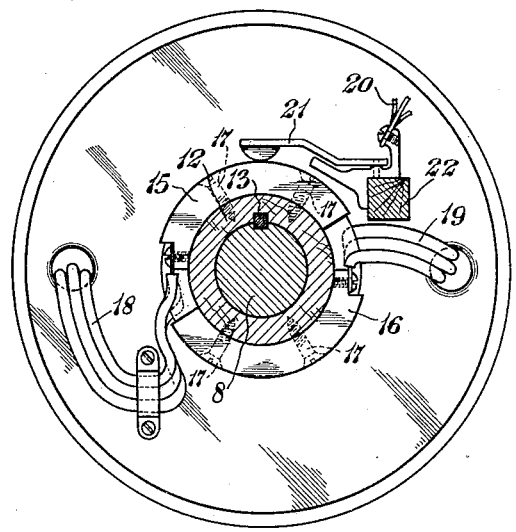
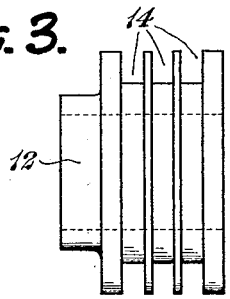
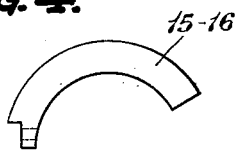
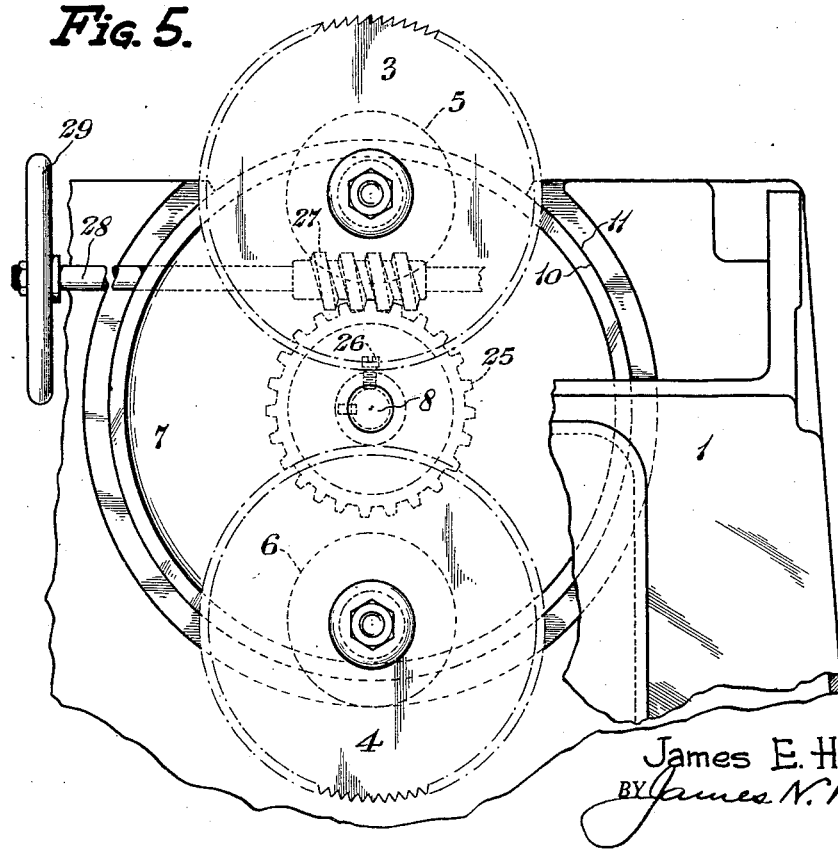
INVENTOR.
James E. Hirst
BY James N. Ramsey
ATTORNEY.

Patented Nov. 25, 1930

1,783,041

UNITED STATES PATENT OFFICE

JAMES E. HIRST, OF CINCINNATI, OHIO, ASSIGNOR TO THE J. A. FAY & EGAN COMPANY, OF CINCINNATI, OHIO, A CORPORATION OF OHIO

WOODWORKING MACHINERY

Application filed August 22, 1929. Serial No. 387,615.

This invention relates to motor driven woodworking tools, such as circular saws and the like, and consists of the novel features herein shown, described and claimed.

The object of the present invention is to improve the construction of the well-known universal circular saw machine whereby all belts, pulleys, idlers, etc., are eliminated from the driving mechanism for the saws and, further, to provide a construction in which the motor is directly connected to, and moves with, its respective saw.

In universal circular saw machines of the past it has been the practice to drive both saws from one motor by means of belts and pulleys. The present invention contemplates the use of a motor for each saw; in means whereby when one saw is in the operative position the circuit of the motor for the inoperative saw is automatically severed from the electrical supply; in means for rigidly supporting the several motors; and in means for revolving said motors about a common axis to thus bring into use the saws alternately above the top of the machine.

In accomplishing the above objects I preferably mount the saw motors upon a common housing, which housing is rotatably mounted within the frame of the machine, and means for rotating said housing within said machine frame whereby the saws are brought into operative position alternately, said means for rotating the housing being capable of positioning either saw from the minimum to the maximum cut.

Another feature of my invention is the novel electrical arrangement whereby, when one saw is in the operative position for sawing material the electrical circuit to its motor is automatically completed, whereas the electrical circuit to the motor for the inoperative saw is automatically severed. Therefore, it will be clearly apparent that the motor for the inoperative saw is at rest during the time the motor for the operative saw is at work.

Other objects and advantages will appear from the drawings and specification.

The accompanying drawings illustrate the construction and operation of a motor driven woodworking tool embodying the principles of my invention.

Referring to the drawings:

Fig. 2 is an enlarged side elevation of the electrical switch used for the several saw motors;

Fig. 3 is an enlarged detail of the insulating core forming part of the switch shown in Fig. 2;

Fig. 4 is a detail view of one of the switch contact members; and

Fig. 5 is a side elevation of the motor housing, motors and saws and showing the means for rotating the saws about a common axis.

Figure 1:
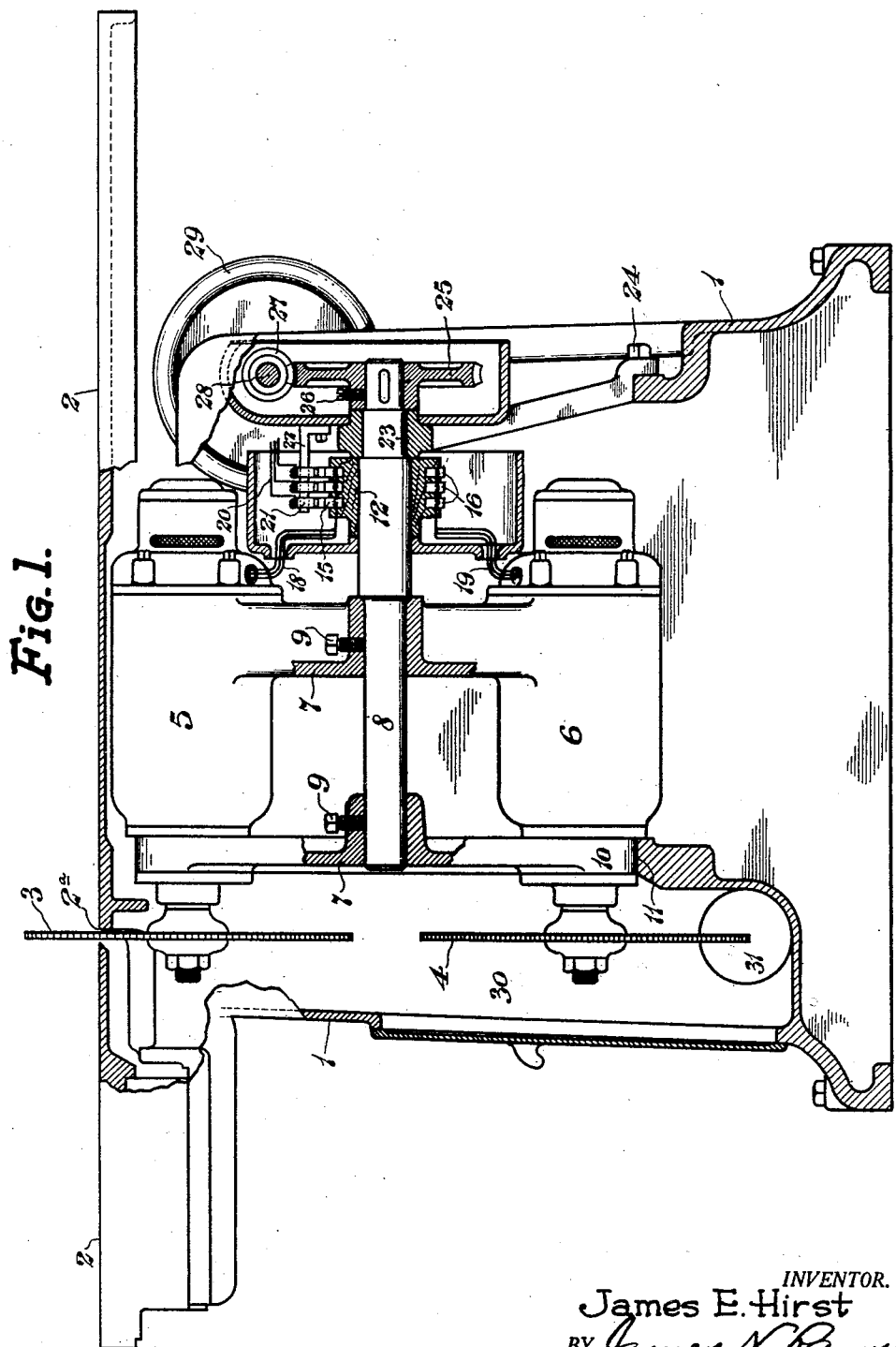
Fig. 1 is an end view of a universal circular saw machine embodying my invention, parts of which are broken away and shown in vertical section.

In the embodiment of my invention as illustrated and which shows a preferred construction I provide a universal circular saw machine comprising, generally, a frame 1, table 2, circular rip saw 3 and circular cross cut saw 4. As clearly shown in Fig. 1, circular rip saw 3 is directly connected to, and driven by, motor 5 and circular cross cut saw 4 is directly connected to, and driven by, motor 6. These motors 5 and 6 are spaced apart from one another and securely mounted within motor housing 7. Said housing 7 is securely fixed to shaft 8 in any suitable manner, as, for example, by set screws 9. The outer periphery 10 of motor housing 7 is rotatably supported within the frame 1 at 11, as clearly shown in Fig. 1.

Referring now to the electrical switch which controls the operation of the motors 5 and 6, let us mention that the showing here made is for a three phase system but this, it is to be understood, is not in a limiting sense, as single phase, or any other suitable phase motors can be readily used. The electrical switch comprises an insulating core 12, such as wood or the like, which core is fixed to shaft 8 by means of a key 13, so as to be movable therewith, as clearly shown in Fig. 2. The core 12 is provided with annular recesses 14 on its outer periphery, as clearly illustrated in Fig. 3 within which switch contact members 15 and 16 are held by screws 17.

The switch contact members 15 are connected with motor 5 by suitable circuit wires 18 and the switch contact members 16 are connected to motor 6 by suitable circuit wires 19, as clearly shown in Fig. 1. The outside source of electric current is supplied through circuit wires 20, which wires are suitably connected to brush bars 21, respectively. In Fig. 2 the brush bars 21 are shown engaged with the switch contact members 15; therefore, the electrical circuit through wires 18 is completed to the motor 5 which, in turn, revolves the circular rip saw 3. When the shaft 8 is turned one-half of a revolution (by mechanism to be explained later) the switch contact members 15 will, consequently, be moved out of engagement with the brush bars 21 and the switch contact members 16 will be moved into engagement with said brush bars; it follows, therefore, that the electrical circuit to motor 6 is completed whereupon the circular cross cut saw 4 is rotated and the electrical circuit to motor 5 is automatically severed.

The brush bars 21 are carried upon an arm 22, which arm is supported by the frame 1 and, therefore, is stationary preferably above the shaft 8, as clearly shown in Fig. 1. One end of shaft 8 is supported by the motor housing 7, while the other end of said shaft is rotatably journaled within bearing 23, said bearing being carried by the frame 1 and secured thereto by bolts 24.

Worm gear 25 is keyed to the shaft 8 and secured thereon by set screw 26 and worm 27 is in permanent mesh with said worm gear 25, as clearly shown in Figs. 1 and 5, respectively. Worm 27 is fixed to horizontal shaft 28, said shaft being suitably mounted for rotation within the frame 1 and a hand wheel 29 is fixed to the outer end of said shaft 28 (see Figs. 1 and 5, respectively).

Referring now to the operation of my novel universal saw machine, let us refer to Fig. 1, where it will be seen that the circular rip saw 3 is protruding upwardly through the usual opening 2ª in table 2 and the motor 5 for said saw 3 is suitably connected with feed wires 20 leading to the outside source of electrical supply by reason of the brush bars 21 being in engagement with the switch contact members 15. With the machine in this position the rip saw 3 can be revolved to cut work laid upon the top of table 2.

Then let us assume that the need of a cross cut saw arises; all that is necessary to replace the rip saw 3 by the cross cut saw 4 is to manually rotate the hand wheel 29 which, in turn, rotates shaft 28, worm 27, worm gear 25 and shaft 8. This movement of the shaft, in turn, revolves the motor housing 7 and the insulating core 12, so that motor 6 is moved from the lower position, as shown in Fig. 1, to the upper position now occupied by motor 5. This movement of the insulating core 12, in turn, removes the switch contact members 15 from beneath the brush bars 21 and brings into engagement with said brush bars the switch contact members 16. Therefore, it is self-evident that the electrical circuit to motor 5 is severed and the electrical circuit to motor 6 completed. In other words, it is only possible to complete the electrical circuit to the motor occupying the elevated position while the electrical circuit of the motor occupying the lower position is automatically severed. As it is only necessary, in a machine of this class, to operate one saw at a time, there would be no need for operating the saw moved to the lower position within the frame 1, as is the cross cut saw 4, represented in Fig. 1.

If it is desired to simultaneously sever the electrical circuit to both motors 5 and 6, respectively, any common switch (not shown) can be inserted within the infeed wires 20 and suitably mounted upon the frame of the machine.

By movement of the hand wheel 29, either of the saws 3 and 4 can be moved from their minimum to their maximum cut, respectively, the length of the contact members 15 and 16 being such as to complete the circuit to the operative motor throughout its range of movement during the cutting of different depths.

An advantage of my improvement in universal circular saw machines is that no belts, pulleys or idlers are required in the drive for the saws 3 and 4, as each saw has its individual motor directly connected therewith and, further, in using the forward end of the motor housing 7 to confine the waste material, such as sawdust, within compartment 30, whereupon it can be exhausted through the piping system 31 in the usual and well-known manner.

Another advantage of my invention is the automatic switch for controlling the alternate operation of motors 5 and 6, respectively.

Still another advantage of my construction is that all of the working parts are enclosed within the frame 1, thus giving the machine a neater appearance than that of machines now on the market, wherein the drive to the saws are accomplished by means of belts and pulleys and wherein the motor for driving said belts is mounted upon the outside of the frame 1.

While I have shown and described one preferred embodiment of my invention it is to be understood that certain changes and modifications can be made without departing from the scope or spirit thereof as defined in the claims.

What I claim as new and desire to secure by Letters Patent is:

1. In a sawing machine of the class described, the combination of a frame, a work supporting table carried thereby, a motor housing rotatably mounted within the frame, a horizontal shaft fixed to said housing and journaled in said frame, a plurality of motors carried by said housing and concentrically arranged about said shaft, a circular saw connected with each motor, manually controlled means for rotating said motor housing and shaft, respectively, to project said saws through an opening in said table alternately, and switching means fixed to said shaft and frame whereby the movement of said shaft controls the electrical circuit to the motor of the saw projecting through said table, the electrical circuits of the remaining motors being automatically severed at this time by said switching means.

2. In a woodworking machine of the class described, a frame, a table therefor, a plurality of circular saws, a motor directly connected with each saw, means for moving said saws within said frame so that when one of said saws is extending through an opening in the table the other of said saws will be concealed within the frame of the machine, and switching means for completing the electrical circuit to the motor of the saw extending through the table, said switching means being actuated by the means for moving said saws and automatically severing the electrical circuit to the motor of the saw concealed within the frame of said machine.

3. In a woodworking machine of the class described, the combination of a frame, a table therefor, a pair of circular saws, a pair of motors directly connected to said saws, respectively, a housing for supporting said motors in spaced apart relation, said housing being rotatably mounted within said frame, manually controlled means for rotating said housing within said frame to alternately project said saws through an opening in said table, and switching means actuated by the movement of said housing whereby an electrical circuit is completed for one motor and the electrical circuit to the other motor is automatically severed.

4. In a woodworking machine, the combination of a frame, a work supporting table therefor having a tool opening therein, a shaft rotatably mounted within the frame, means for rotating said shaft, a motor housing fixed to said shaft and adapted to be rotated by the latter, a plurality of motors carried by said housing and concentrically arranged about said shaft, a circular saw connected to each motor and adapted to be driven thereby, and switching means partly fixed to said shaft and to said frame, part of said means being movable with the shaft whereby an electrical circuit is closed to the highest motor to rotate its saw projecting through said tool opening during adjustment from the minimum to the maximum cut, the electrical circuit to the remaining motor being severed so that their respective saws below the table are at rest.

5. In combination, a sawing machine of the class described comprising a frame, a work supporting table therefor having a tool opening therein, a motor housing rotatably mounted within said frame, a plurality of motors carried by said housing and movable therewith, a circular saw directly connected with each motor and adapted to be driven thereby, a horizontal shaft fixed to said housing and rotatably journaled within the frame, manually controlled means for revolving said shaft and housing in unison, switching means carried by said frame and shaft, respectively, said switching means adapted to complete the electrical circuit of the motor for the saw projecting upwardly through said tool opening, said circuit being closed throughout the entire travel of the saw from the minimum to the maximum cut.

6. In a woodworking machine, the combination of a frame, a work supporting table therefor, a rotatable motor housing supported within the frame, a plurality of motors carried by said housing, a circular saw connected with each motor, a main shaft fixed to said motor housing and journaled within said frame, means for rotating said shaft comprising a worm gear fixed thereto, a worm rotatably supported by the frame and in permanent mesh with said gear, a shaft fixed to said worm, a hand wheel fixed to said last-mentioned shaft, and switching means carried by said frame and shaft capable of closing the electrical circuit to the motor for the highest or selected saw, said circuit being closed from the minimum to the maximum cut of said saw and the electrical circuit to the remaining motor being severed automatically by said switching means.

JAMES E. HIRST.